United States Patent
Huang

(10) Patent No.: US 11,026,289 B2
(45) Date of Patent: Jun. 1, 2021

(54) BASE STATION AND RESOURCE ALLOCATION METHOD BASED ON SEMI-PERSISTENT SCHEDULING

(71) Applicant: Industrial Technology Research Institute, Hsinchu (TW)

(72) Inventor: Jen-Feng Huang, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 34 days.

(21) Appl. No.: 16/233,124

(22) Filed: Dec. 27, 2018

(65) Prior Publication Data

US 2020/0214079 A1 Jul. 2, 2020

(51) Int. Cl.
| | | |
|---|---|---|
| *H04L 1/18* | (2006.01) | |
| *H04W 76/00* | (2018.01) | |
| *G06F 11/08* | (2006.01) | |
| *H04W 76/30* | (2018.01) | |
| *H04L 1/00* | (2006.01) | |

(Continued)

(52) U.S. Cl.
CPC ........... *H04W 76/30* (2018.02); *H04L 1/0061* (2013.01); *H04L 1/1819* (2013.01); *H04L 5/0053* (2013.01); *H04W 72/042* (2013.01)

(58) Field of Classification Search
CPC ..... H04W 76/25; H04W 76/30; H04W 72/04; H04W 72/042; H04W 76/34; H04W 28/06; H04L 1/0061; H04L 1/1819; H04L 1/1887; H04L 5/0053; H04L 1/1854; H04L 5/0091; H04L 1/1812; G06F 11/08
USPC ........................................................ 370/329
See application file for complete search history.

(56) References Cited

U.S. PATENT DOCUMENTS

2012/0176887 A1* 7/2012 Mcbeath ............... H04L 1/1822
370/216
2012/0269143 A1* 10/2012 Bertrand ........... H04W 72/1231
370/329

(Continued)

FOREIGN PATENT DOCUMENTS

| CN | 101809897 | | 8/2010 | |
|---|---|---|---|---|
| CN | WO 2014/198059 A1 | * | 6/2013 | ............ H04W 76/06 |

(Continued)

OTHER PUBLICATIONS

Prashant Wali, et al., "PS-SPS: Power Saving-Semi Persistent Scheduler for VoLTE in LTE-Advanced," 2015 IEEE International Conference on Electronics, Computing and Communication Technologies (CONECCT), Jul. 2015, pp. 1-6.

(Continued)

*Primary Examiner* — Edan Orgad
*Assistant Examiner* — Vanneilian Lalchinthang
(74) *Attorney, Agent, or Firm* — JCIPRNET

(57) ABSTRACT

The disclosure provides a base station and a resource allocation method based on semi-persistent scheduling (SPS). The method includes: periodically receiving a plurality of uplink data corresponding to a user equipment (UE) on a wireless resource assigned to the UE; in response to consecutively receiving a predetermined number of specific uplink data, performing a release SPS operation to cease receiving other uplink data corresponding to the UE on the wireless resource, wherein the specific uplink data consist of pending data and error data or consist of the error data.

18 Claims, 9 Drawing Sheets

(51) Int. Cl.
*H04W 72/04* (2009.01)
*H04L 5/00* (2006.01)

(56) References Cited

U.S. PATENT DOCUMENTS

| | | | | |
|---|---|---|---|---|
| 2014/0161069 | A1* | 6/2014 | Ohta | H04L 5/00 370/329 |
| 2015/0016390 | A1* | 1/2015 | McBeath | H04L 1/1822 370/329 |
| 2017/0027018 | A1* | 1/2017 | Langereis | H04W 72/042 |
| 2017/0118701 | A1* | 4/2017 | Kim | H04W 48/16 |
| 2017/0164354 | A1* | 6/2017 | Yang | H04L 1/18 |
| 2017/0290030 | A1* | 10/2017 | Wang | H04W 72/0446 |
| 2017/0332358 | A1* | 11/2017 | Park | H04W 72/042 |
| 2018/0042032 | A1* | 2/2018 | Yuan | H04W 72/12 |
| 2018/0309544 | A1* | 10/2018 | Hwang | H04L 1/1887 |
| 2019/0021085 | A1* | 1/2019 | Mochizuki | H04W 72/04 |
| 2019/0110305 | A1* | 4/2019 | Ookubo | H04W 28/16 |

FOREIGN PATENT DOCUMENTS

| | | |
|---|---|---|
| CN | 101766012 | 7/2014 |
| CN | 103414533 | 8/2016 |
| EP | 3195689 | 7/2017 |
| TW | 201114300 | 4/2011 |
| WO | 2017163785 | 9/2017 |

OTHER PUBLICATIONS

Prashant K. Wali, et al., "Enhanced-Power Saving Semi-Persistent Scheduler for VoLTE in LTE-Advanced," IEEE Transactions on Wireless Communications, vol. 15, Nov. 2016, pp. 7858-7871.

Xin Lv, et al., "Resource Allocation Algorithm for VoLTE with Semi-Persistent Scheduling," 2015 IEEE 81st Vehicular Technology Conference (VTC Spring), May 2015, pp. 1-5.

Nusrat Afrin, et al., "Performance Evaluation of an Adaptive Semi-Persistent LTE Packet Scheduler for M2M Communications," 2014 8th International Conference on Signal Processing and Communication Systems (ICSPCS), Dec. 2014, pp. 1-7.

Nusrat Afrin, et al., "An Adaptive Buffer Based Semi-Persistent Scheduling Scheme for Machine-to-Machine Communications over LTE," 2014 Eighth International Conference on Next Generation Mobile Apps, Services and Technologies, Sep. 2014, pp. 1-6.

Maciej Mühleisen, et al., "Uplink VoIP Capacity of 3GPP LTE under Power Control and Semi-Persistent Scheduling," 2013 Australasian Telecommunication Networks and Applications Conference (ATNAC), Nov. 2013, pp. 69-76.

Renato Abreu, et al., "Pre-scheduled Resources for Retransmissions in Ultra-Reliable and Low Latency Communications," 2017 IEEE Wireless Communications and Networking Conference (WCNC), Mar. 2017, pp. 1-5.

"Office Action of Taiwan Counterpart Application," dated Oct. 17, 2019, p. 1-p. 11.

* cited by examiner

BASE STATION AND RESOURCE ALLOCATION METHOD BASED ON SEMI-PERSISTENT SCHEDULING

TECHNICAL FIELD

The disclosure relates to a base station and a resource allocation method, and more particularly, relates to a base station and a resource allocation method based on semi-persistent scheduling (SPS).

BACKGROUND

Usually, a packet transmission is performed by using a dynamic scheduling in a mobile network. The dynamic scheduling may be interpreted as to request for a wireless resource used to transmit data only when the transmission is about to start. In general, uplink data transmitted by a user equipment (UE) requests for the wireless resource based on a scheduling request.

Unlike the dynamic scheduling mechanism described above, SPS allows an enhanced node B (eNB) to semi-statically allocate the wireless resources, so as to periodically assign the wireless resource to one specific UE. Since SPS is characterized by its capability of continuous and stable scheduling as well as reduction on needs for control packets (e.g., a downlink control information (DCI) packet), SPS can be used in a Voice over LTE (VoLTE) transmission of an LTE network in a cellular system or other future communication systems such as 5G system. Because the SPS can achieve multiple transmissions with only one scheduling, an SPS mechanism is quite important for the cellular system in which the VoLTE is to be performed.

According to the regulation in the specification of 3GPP TS 36.321, the eNB will periodically assign a resource to the UE when the SPS mechanism is adopted between the UE and the eNB. Correspondingly, the UE also periodically transmits data to the eNB through uplink. If the assigned resource is no longer required when the UE intends to end the VoLTE, the UE will transmit a predetermined number of pending data.

However, in some cases, if the eNB cannot successfully receive the pending data, a situation in which the wireless resource is wasted may occur.

SUMMARY

The disclosure provides a resource allocation method based on SPS, which is adapted for a base station and includes: periodically receiving a plurality of uplink (UL) data corresponding to a user equipment on a wireless resource assigned to the user equipment; in response to consecutively receiving a predetermined number of specific uplink data, performing a release SPS operation to cease receiving other uplink data corresponding to the user equipment on the wireless resource, wherein the specific uplink data consist of at least one pending data and at least one error data or consist of the at least one error data.

The disclosure provides a base station, which includes a storage circuit, a transceiver and a processor. The storage unit stores a plurality of modules. The processor is coupled to the transceiver and the storage circuit, and accesses the modules to perform steps of: controlling the transceiver to periodically receive a plurality of uplink (UL) data corresponding to a user equipment on a wireless resource assigned to the user equipment; in response to consecutively receiving a predetermined number of specific uplink data from the user equipment, performing a release semi-persistent scheduling (SPS) operation to cease receiving other uplink data corresponding to the user equipment on the wireless resource, wherein the specific uplink data consist of at least one pending data and at least one error data or consist of the at least one error data.

Based on the above, the base station and the resource allocation method based on SPS thereof proposed by the disclosure can allow the base station to correspondingly release the wireless resource assigned to the UE after consecutively receiving the predetermined number of specific uplink data (which are consist of the pending data and at least one error data). As a result, unnecessary waste of the wireless resources due to the CRC error may be avoided and the communication efficiency may also be improved.

To make the above features and advantages of the disclosure more comprehensible, several embodiments accompanied with drawings are described in detail as follows.

DETAILED DESCRIPTION

Figure 1:
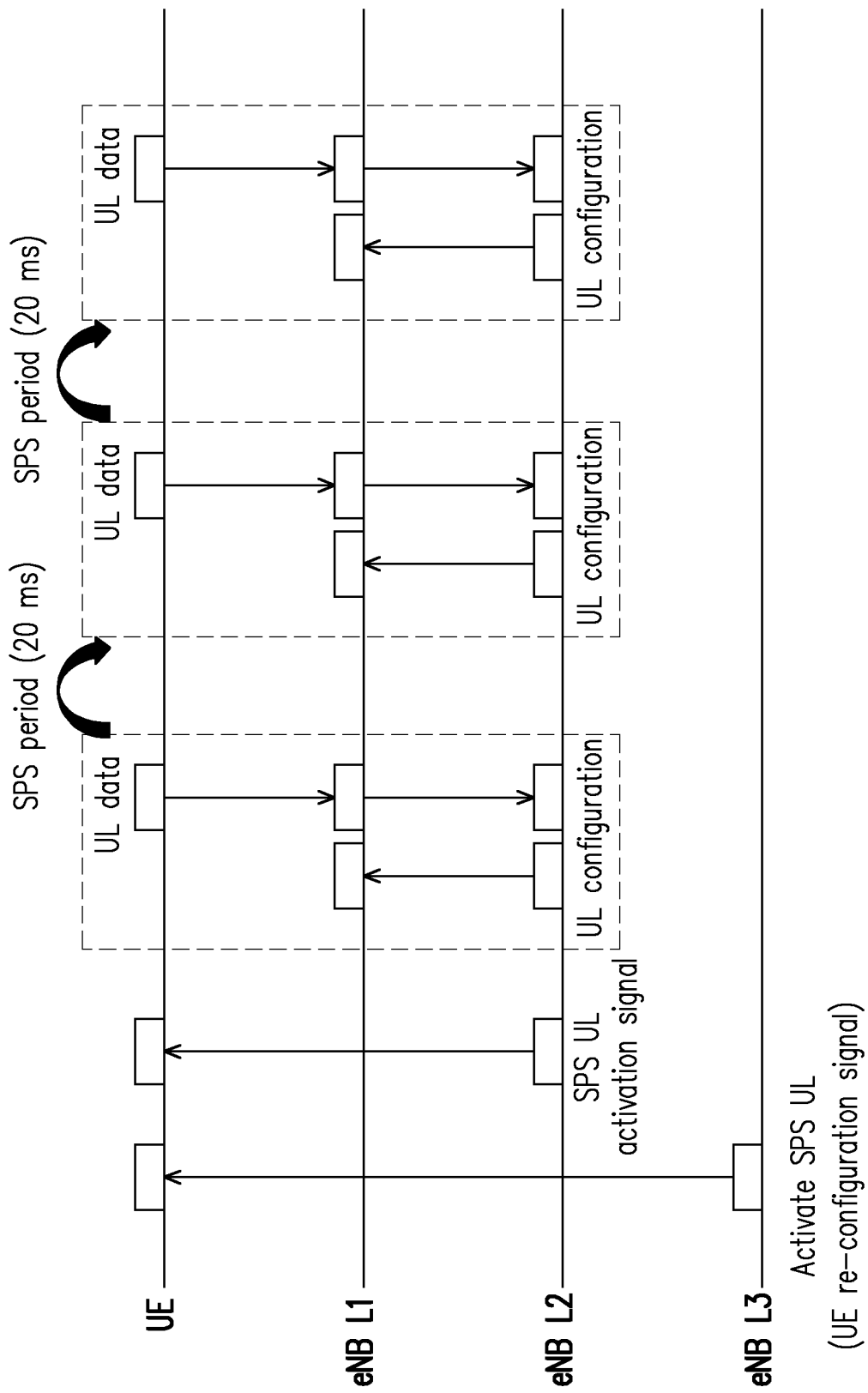
FIG. 1 is a schematic diagram illustrating a SPS mechanism according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

With reference to FIG. 1, FIG. 1 is a schematic diagram illustrating a SPS mechanism according to an embodiment of the disclosure, in which a horizontal axis represents time. In this embodiment, an eNB may have a physical layer (referred to as L1), a medium access control layer (referred to as L2), and a radio link control layer (referred to as L3).

As shown by FIG. 1, when the eNB intends to communicate with a UE by adopting SPS, the eNB L3 can transmit a UE re-configuration signal to the UE to enable SPS UL. After the UE re-configuration signal is received by the UE, the UE can learn that UL data is about to be transmitted to the eNB based on the SPS mechanism.

Next, the eNB L2 can transmit an SPS UL activation signal to the UE to formally activate the SPS mechanism. Afterwards, the UE can periodically use a wireless resource assigned by the eNB L2 to transmit the UL data. Correspondingly, based on a UL configuration signal, the eNB L2 can control the eNB L1 to periodically listen to the UL data transmitted by the UE on the wireless resource assigned to the UE. In this embodiment, an SPS period of the UE for transmitting the UL data is, for example, 20 ms, but the disclosure is not limited thereto. In other embodiments, the SPS period may also be adjusted to other values regulated in the specification, such as 160 ms. In this embodiment, taking the LTE system as an example, the SPS UL activation signal is a DCI (downlink control information) packet, but is not limited thereto. The SPS UL activation signal is determined according to the instructions or packets for controlling the SPS in various communication systems.

Figure 2:
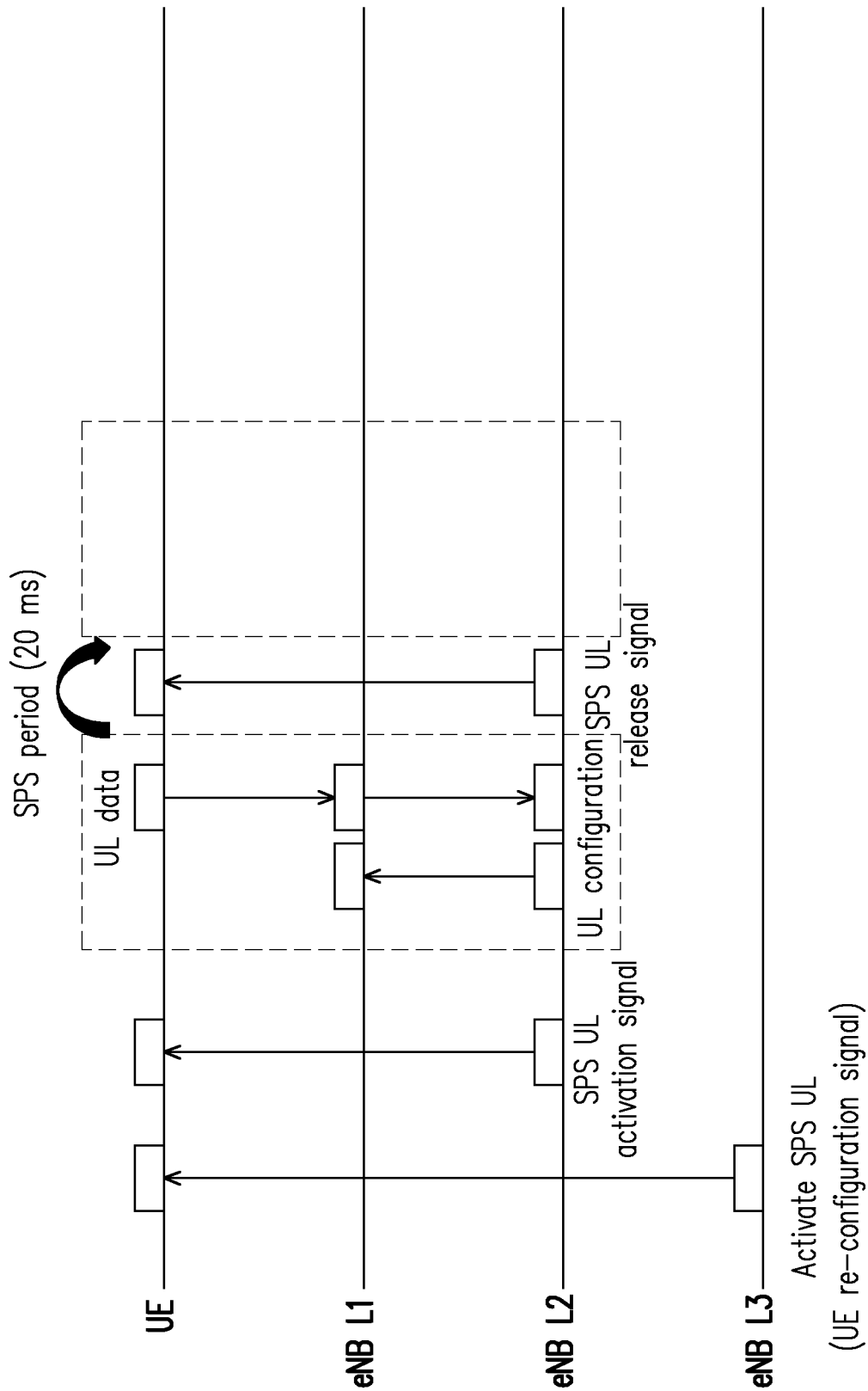
FIG. 2 is a schematic diagram illustrating how the SPS mechanism is ended according to an embodiment of the disclosure.
Figure 3:
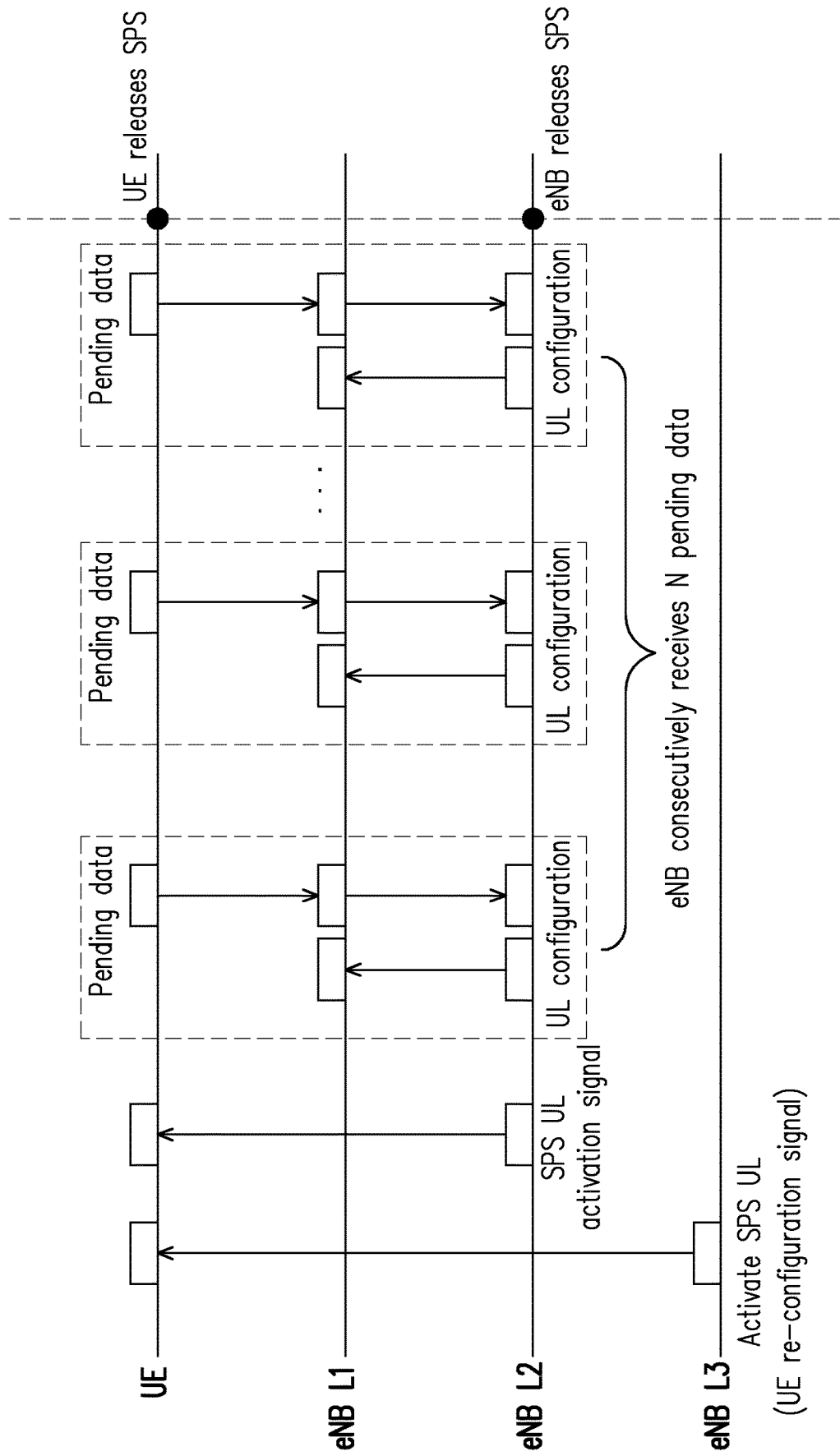
FIG. 3 is a schematic diagram illustrating how the SPS mechanism is ended according to another embodiment of the disclosure.

In different embodiments, the SPS mechanism may be terminated by methods shown by FIG. 2 and FIG. 3.

With reference to FIG. 2, FIG. 2 is a schematic diagram illustrating how the SPS mechanism is ended according to an embodiment of the disclosure, in which a horizontal axis represents time. In this embodiment, when the eNB intends to terminate the SPS mechanism, the eNB L2 can transmit as SPS UL release signal to the UE. Correspondingly, the UE will not continue to periodically transmit the UL data, and the eNB L2 will no longer control the eNB L1 to periodically listen to the UL data transmitted by the UE on the wireless resource assigned to the UE based on the UL configuration signal either. In this embodiment, taking the LTE system as an example, the SPS UL release signal is a DCI (downlink control information) packet, but is not limited thereto. The SPS UL release signal is determined according to the instructions or packets for controlling the SPS in various communication systems.

With reference to FIG. 3, FIG. 3 is a schematic diagram illustrating how the SPS mechanism is ended according to another embodiment of the disclosure, in which a horizontal axis represents time. In this embodiment, if the UE intends to end the SPS mechanism, the UE can consecutively transmit a predetermined number of (hereafter, referred to as N) pending data to the eNB L2. Here, the pending data is, for example, data that includes a header and no payload, but not limited thereto. Afterwards, the UE can release the SPS. That is to say, the UE will no longer (periodically) transmit the UL data to the eNB. Correspondingly, after the predetermined number of pending data are consecutively received by the eNB L2, the eNB L2 can also release the SPS. In other words, the eNB L2 will no longer control the eNB L1 to periodically listen to the UL data transmitted by the UE on the wireless resource assigned to the UE based on the UL configuration signal, i.e., the wireless resource is not longer assigned to the UE. In this embodiment, the predetermined number is, for example, 8, which may be designated by the eNB L3 in the enabled SPS UL signal, but the disclosure is not limited thereto.

In the present disclosure, the mechanism shown by FIG. 3 may also be referred to as an implicit release. However, in the implicit release mechanism, if some pending data cannot be successfully received by the eNB, the UE and the eNB may not be able to successfully release the SPS, which may cause waste of the resource.

Figure 4:
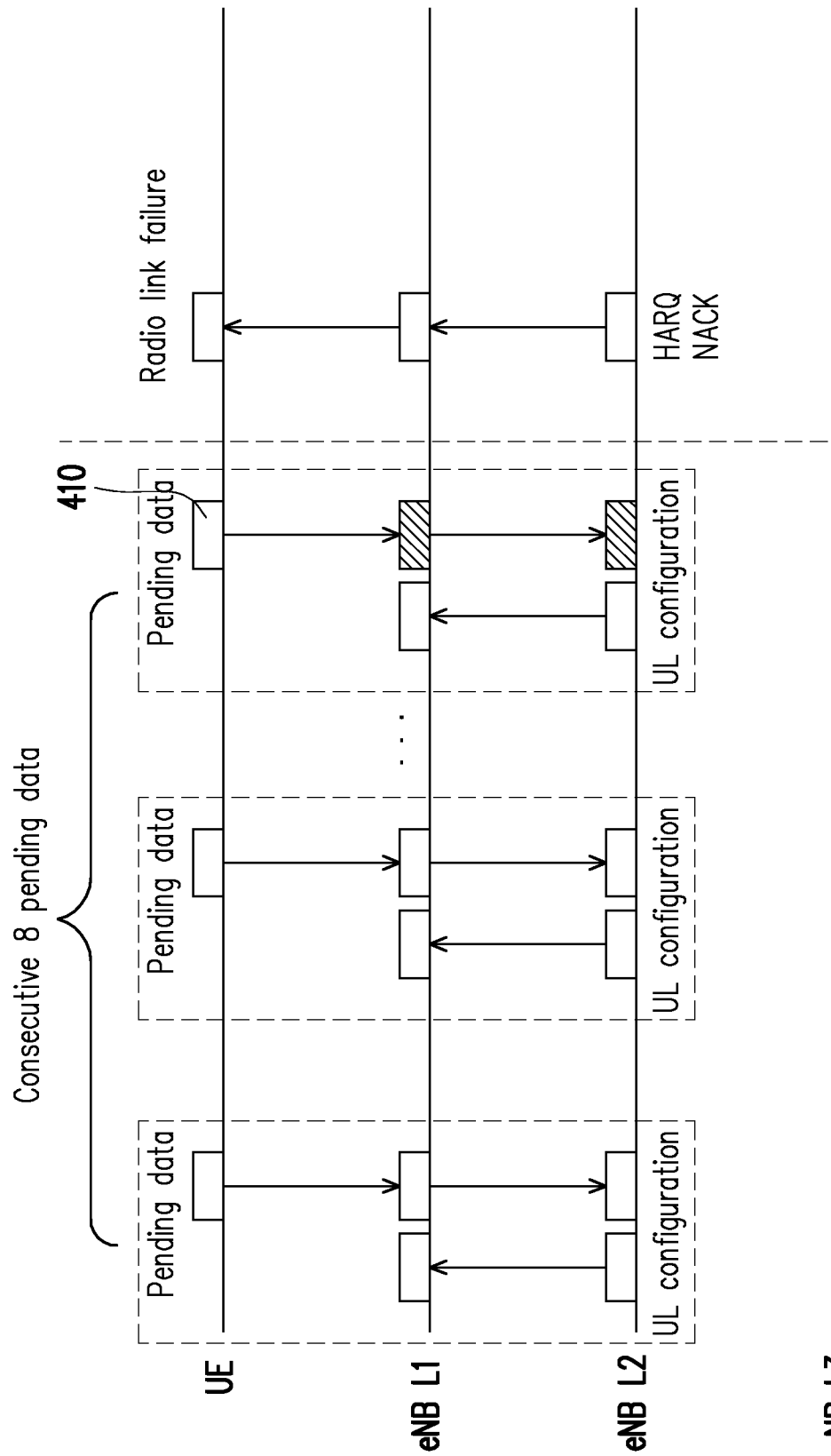
FIG. 4 is a schematic diagram illustrating how the resource is wasted according to an embodiment of the disclosure.

With reference to FIG. 4, FIG. 4 is a schematic diagram illustrating how the resource is wasted according to an embodiment of the disclosure, in which a horizontal axis represents time. In this embodiment, it is assumed that the predetermined number of (i.e., 8) pending data are consecutively transmitted by the UE, and yet pending data 410 (i.e., the $8^{th}$ pending data) is not correctly received by the eNB due to poor channel conditions or other similar reasons. Specifically, after the pending data 410 is received by the eNB, the eNB may first perform a cyclic redundancy check (CRC) operation or the like on the pending data 410 to confirm whether a checksum calculated based on the pending data 410 is correct. However, in the case of poor channel conditions, the eNB may determine that a CRC error occurs due to the inability to successfully complete the CRC operation for the pending data 410. In this case, the eNB can request the UE to re-transmit the pending data 410 based on a hybrid automatic repeat request (HARQ) mechanism.

Yet, before the pending data 410 is successfully received by the eNB (e.g., the CRC operation is completed for the pending data 410 and the content of the pending data 410 is successfully analyzed), the eNB is unable to confirm whether the pending data 410 really belongs to the pending data. At the time, if the pending data 410 still cannot be successfully received due to overly poor channel conditions, the eNB may need to repeatedly request the UE to re-transmit the pending data based on HARQ. In this case, the wireless resource will be occupied unnecessarily, namely, wasted.

In addition, after consecutively transmitting the predetermined number of pending data, it is also possible that the UE will directly perform the release SPS operation without transmitting other data. However, if the eNB mistakenly determines that the unsuccessfully received pending data 410 is the UL data, the eNB L2 will still control the eNB L1 to listen to the UL data transmitted by the UE on the wireless resource assigned to the UE based on the UL configuration signal. Because the SPS is already released by the UE, the eNB L1 will not receive the UL data transmitted by the UE so the wireless resource is wasted.

In addition, it is assumed that, the UE transmits one UL data after consecutively transmitting (N−1) pending data, and somehow that UL data cannot be successfully analyzed by the eNB. In this case, if the eNB mistakenly determines that the unsuccessfully received UL data is the pending data, the eNB may perform the release SPS operation in response to determining that the N pending data are consecutively received. That is to say, the eNB L1 will no longer listen to the UL data transmitted on the wireless resource assigned to the UE. Accordingly, data subsequently transmitted by the UE will not be successfully transmitted to the eNB.

Further, after the SPS is released by the eNB, it is also possible that the eNB will assign the wireless resource originally assigned to the UE to another UE. In this case, the two UEs may encounter a collision caused by conducting transmissions using the same wireless resource.

In an embodiment, when a radio link failure between the UE and the eNB occurs, the eNB may also need to activate a corresponding connection recovery mechanism. However, this recovery mechanism may consume up to 10000 ms at most, and thus reduce the overall system performance.

In addition, problems similar to the above may also occur in a centralized radio access network (C-RAN) architecture. Specifically, because the eNB L1 and the eNB L2 in the C-RAN may be respectively disposed in different machines, there may have a certain degree of latency in the transmission between the eNB L1 and the eNB L2. In this case, when the eNB L2 receives data re-transmitted by the UE in response to the HARQ mechanism, regardless of whether such data is correctly received by the eNB L1, the eNB L2 will first transmit a HARQ acknowledge (ACK) signal. However, in the case of the implicit release, the mechanism above may cause waste of the wireless resource.

Figure 5:
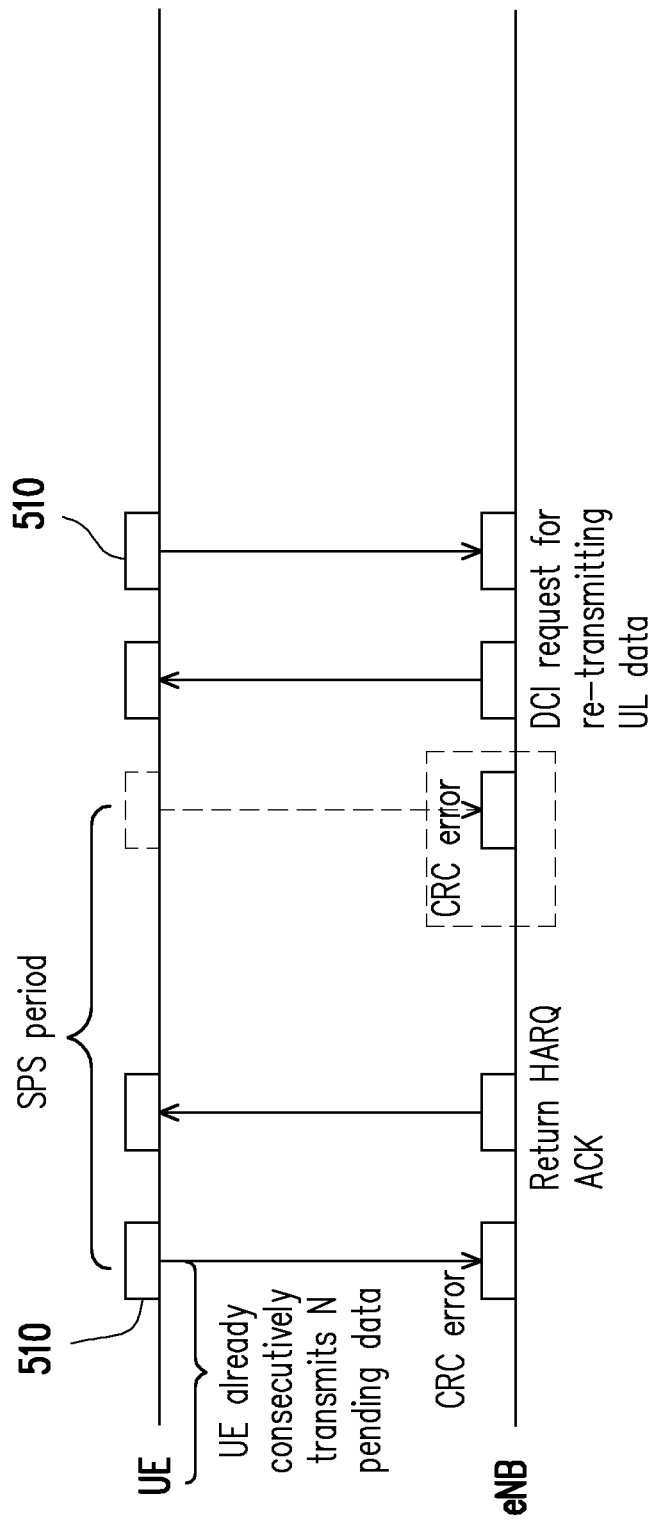
FIG. 5 is a schematic diagram illustrating an implicit release in a C-RAN architecture according to an embodiment of the disclosure.

With reference to FIG. 5, FIG. 5 is a schematic diagram illustrating an implicit release in a C-RAN architecture according to an embodiment of the disclosure, in which a horizontal axis represents time. In this embodiment, it is assumed that, the UE already consecutively transmits the N pending data and releases the SPS, and yet the CRC error occurs when the eNB is analyzing pending data 510 (i.e., an $N^{th}$ pending data). As described in the previous embodiment, the eNB L2 may first return the HARQ ACK signal at the time. However, because the pending data 510 is not correctly analyzed, the eNB may still attempt to listen to the data from the UE again after the SPS period so the wireless resource is wasted. Meanwhile, because the UE does not transmit any data after the SPS period, the eNB may again determine that the CRC error occurs. In addition, when the eNB L2 finds that the pending data 510 is not correctly analyzed, the eNB L2 may further request the UE to re-transmit the pending data 510 through a DCI request.

Accordingly, the disclosure proposes a base station and a scheduling method thereof, which can solve the technical problems described above.

Figure 6:
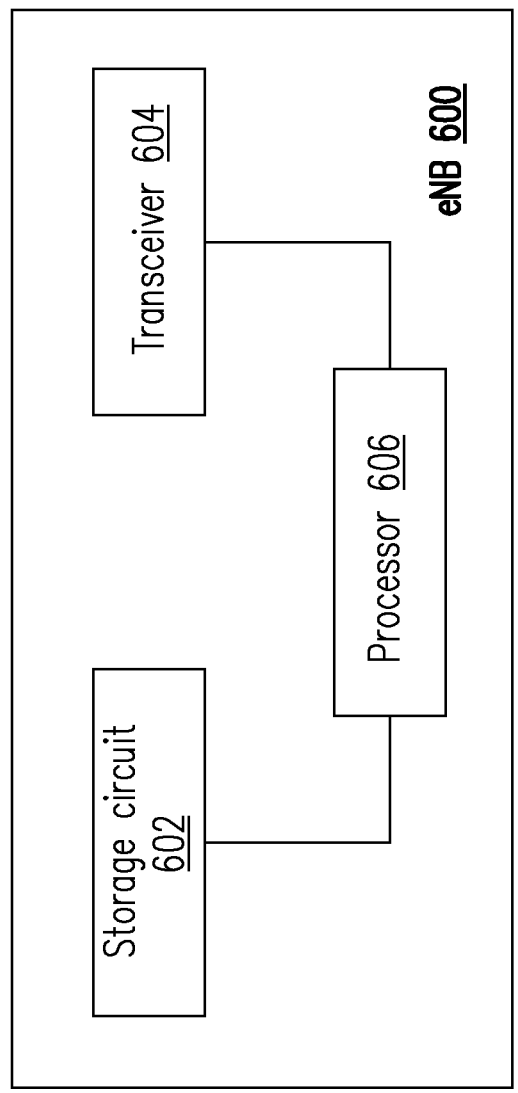
FIG. 6 is a functional block diagram illustrating an eNB according to an embodiment of the disclosure.

With reference to FIG. 6, FIG. 6 is a functional block diagram illustrating an eNB according to an embodiment of the disclosure. In this embodiment, an eNB 600 may be widely interpreted as a general base station, a macro-cell base station, a pico-cell base station or a remote radio head (RRH), but not limited thereto.

As shown by FIG. 6, the eNB 600 may include a storage circuit 602, a transceiver 604 and a processor 606. The storage circuit 602 is, for example, any forms of fixed or movable random access memory (RAM), read only memory (ROM), flash memory, hard disk or other similar devices, or a combination of above-said devices, which can be used to record a plurality of program codes or modules.

The transceiver 604 may include (but not limited to) a transmitter circuit, a receiver circuit, an analog-to-digital (A/D) converter, a digital-to-analog (D/A) converter, a low noise amplifier (LNA), a mixer, a filter, a matching circuit, a transmission line, a power amplifier (PA), one or more antenna units and a local storage media component, which can provide a wireless transmission function for the eNB 600 of FIG. 6.

The transmitter circuit may include functional units for performing operations like low noise amplifying, impedance matching, frequency mixing, lower frequency converting, filtering, amplifying and so on. The receiver circuit may include functional units for performing operations like amplifying, impedance matching, frequency mixing, upper frequency converting, filtering, power amplifying and so on. The A/D converter or the D/A converter are configured to convert an analog signal format into a digital signal format during uplink signal processing, and convert the digital signal format into the analog signal format during downlink signal processing.

The processor 606 is coupled to the storage circuit 602 and the transceiver 604, and may be a processor for general purposes, a processor for special purposes, a conventional processor, a digital signal processor, a plurality of microprocessors, one or more microprocessors, controllers and microcontrollers which are combined with a core of the digital signal processor, an application specific integrated circuit (ASIC), a field programmable gate array (FPGA), any other integrated circuits, a state machine, a processor based on advanced RISC machine (ARM) and the like.

In the embodiments of the disclosure, the processor 606 can load in the program codes or the modules recorded in the storage circuit 602 in order to execute a resource allocation method based on the SPS proposed by the disclosure, which will be described in detail below.

Figure 7:
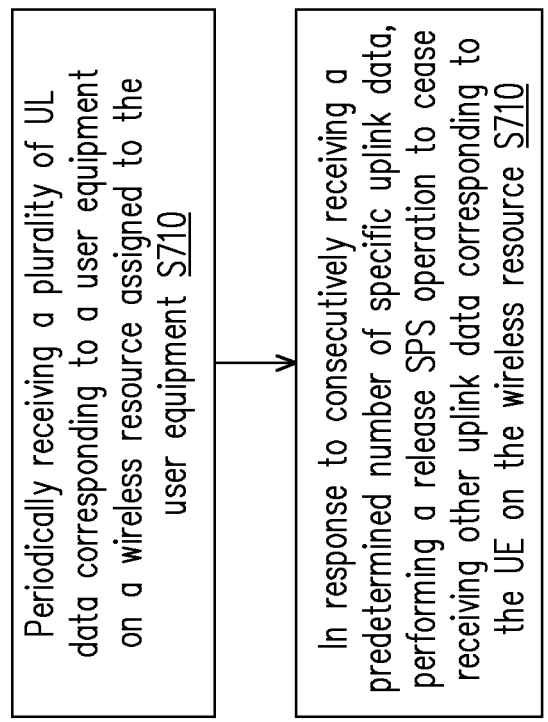
FIG. 7 is a flowchart illustrating a resource allocation method based on SPS according to an embodiment of the disclosure.

With reference to FIG. 7, FIG. 7 is a flowchart illustrating a resource allocation method based on SPS according to an embodiment of the disclosure. The method of this embodiment may be executed by the eNB 600 of FIG. 6, and each step of FIG. 7 will be described in detail with reference to each element shown in FIG. 6.

First of all, in an embodiment, the processor 606 can arrange the wireless resource for the UE based on the SPS mechanism. In an embodiment, the processor 606 can transmit the SPS UL activation signal shown in FIG. 1 to FIG. 3 to the UE, so as to inform the UE of its assigned wireless resource. Correspondingly, the UE can periodically transmit the uplink data to the eNB 600 by using the assigned wireless resource. In this embodiment, taking the LTE system as an example, the SPS UL activation signal is a DCI (downlink control information) packet, but is not limited thereto. The SPS UL activation signal is determined according to the instructions or packets for controlling the SPS in various communication systems.

In step S710, the processor 606 can control the transceiver 604 to periodically receive a plurality of UL data corresponding to the UE on a wireless resource assigned to the UE. In an embodiment, the processor 606 can control the transceiver 604 to periodically receive the uplink data transmitted by the UE on the wireless resource according to the UL configuration signal shown in FIG. 1 to FIG. 3. Details regarding how the wireless resource is arranged for the UE based on the SPS mechanism and details regarding step S710 may refer to related descriptions in the foregoing embodiments, which are not repeated hereinafter.

Then, in step S720, in response to consecutively receiving a predetermined number of specific uplink data, the processor 606 can perform a release SPS operation to cease receiving other uplink data corresponding to the UE on the wireless resource. In the embodiments of the disclosure, the predetermined number of specific uplink data may consist of at least one pending data and at least one error data or consist of the at least one error data. Here, the error data is, for example, CRC error data, but the disclosure is not limited thereto.

In an embodiment, the processor 606 may initialize a count value to 0, and such count value may represent the number of specific uplink data consecutively received. Afterwards, each time when the processor 606 receives one of uplink data, the processor 606 can determine whether that uplink data belongs to the pending data or the error data. If so, the processor 606 can increment the count value. On the other hand, if the uplink data does not belong to the pending data or the error data, it means that this uplink data is normal uplink data with the payload. In this case, the processor 606 can reset the count value to 0. When the count value is accumulated to the predetermined number, it means that the processor 606 already consecutively receives the predetermined number of specific uplink data from the UE. Therefore, the processor 606 can correspondingly perform the release SPS operation, so as to release the wireless resource, but the disclosure is not limited thereto.

Figure 8:
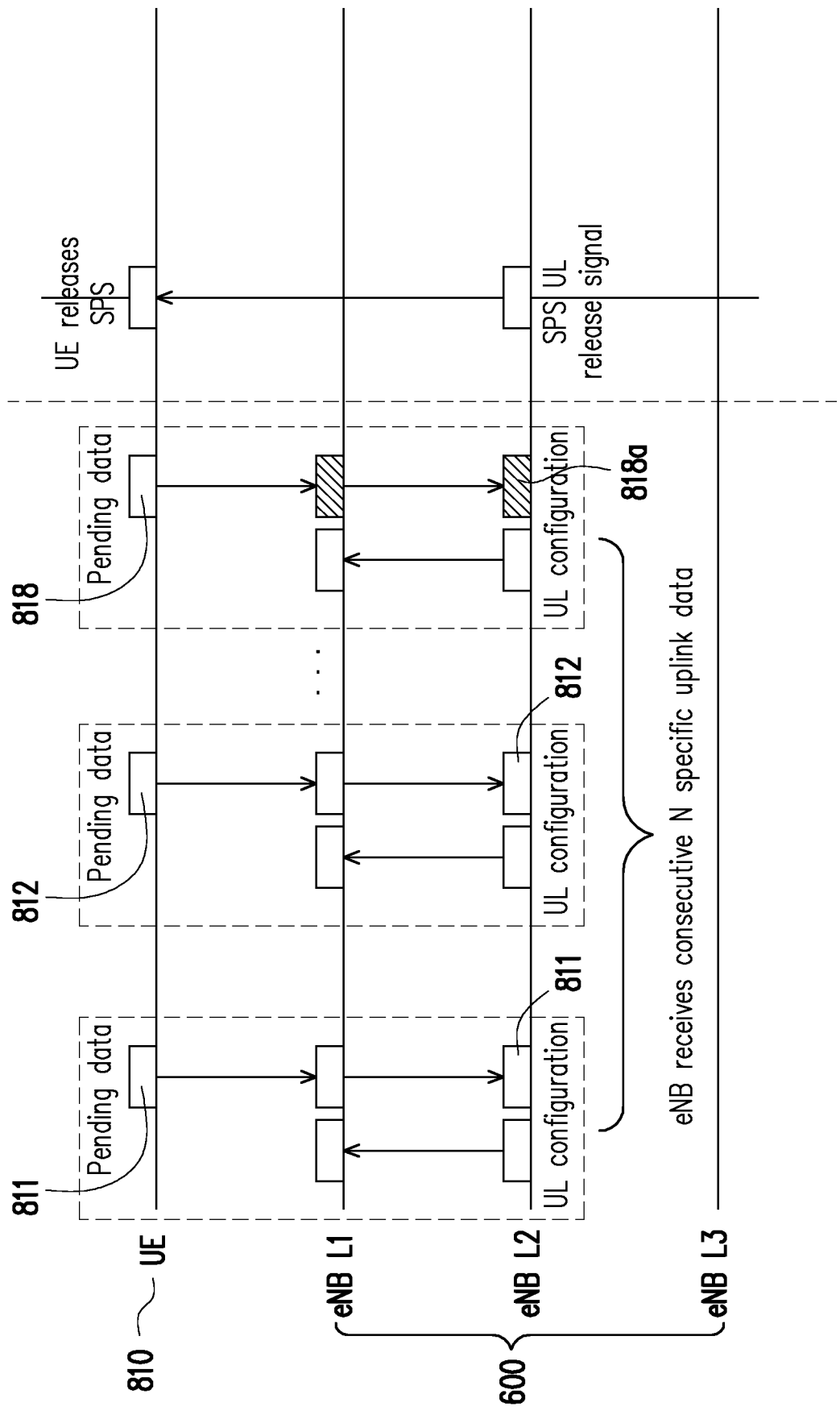
FIG. 8 is a schematic diagram illustrating a release SPS mechanism according to an embodiment of the disclosure.

To make the concept of step S720 clearer, further description is provided below with reference to FIG. 8. With reference to FIG. 8, FIG. 8 is a schematic diagram illustrating a release SPS mechanism according to an embodiment of the disclosure, in which a horizontal axis represents time.

In this embodiment, it is assumed that the predetermined number is 8 (i.e., N is 8) and a UE 810 consecutively transmits 8 pending data 811, 812, . . . , and 818. However, the CRC error occurs when the eNB 600 is analyzing the pending data 818. That is to say, after successfully analyzing 7 pending data 811 to 817, the eNB 600 determines that 1 error data 818*a* occurs.

At the time, when determining that the predetermined number of specific uplink data are already consecutively received (i.e., 7 pending data 811 to 817 and 1 error data, wherein the pending data 813 to 817 are not shown in the drawing), the eNB 600 can perform the release SPS operation to cease receiving the other uplink data corresponding to the UE 810 on the wireless resource assigned to the UE 810. In addition, the eNB 600 may also control the UE 810 through the SPS UL release signal to also perform the release SPS operation. In this embodiment, taking the LTE system as an example, the SPS UL release signal is a DCI (downlink control information) packet, but is not limited thereto. The SPS UL release signal is determined according to the instructions or packets for controlling the SPS in various communication systems.

That is to say, in response to consecutively receiving the predetermined number of specific uplink data as determined by the eNB 600, both the eNB 600 and the UE 800 can perform the release SPS operation. In this way, various mentioned situations where the wireless resource is wasted in the previous embodiments can be avoided so the overall system performance can be improved.

It should be understood that, the specific uplink data shown in FIG. 8 are illustrative only, instead of limiting possible embodiments of the disclosure. In other embodiments, the data with the CRC error may also be one or more of the pending data 811 to 817, rather than being limited to the pending data 818. In brief, as long as the eNB 600 determines that the consecutive N specific uplink data consist of the pending data and the error data are already received, both the eNB and the UE 810 can perform the release SPS operation to achieve the effectiveness of saving unlink resource.

Further, as compared to the approach of FIG. 4 that consumes up to 10000 ms at most, the method proposed by the disclosure will almost take no extra time, and thus the overall system performance can be improved.

In addition, in an embodiment, after the release SPS operation is performed by each the eNB 600 and the UE 810, the eNB 600 can transmit the SPS UL activation signal to the UE 810 again, so as to re-activate the SPS mechanism between the eNB 600 and the UE 810. Afterward, the eNB 600 can communicate with the UE 810 again based on the method shown by FIG. 1, and details regarding the same are not repeated hereinafter. In this embodiment, taking the LTE system as an example, the SPS UL activation signal is a DCI (downlink control information) packet, but is not limited thereto. The SPS UL activation signal is determined according to the instructions or packets for controlling the SPS in various communication systems.

In addition, in an embodiment, the method proposed by the disclosure is also adapted to the eNB 600 belonging to the C-RAN.

Figure 9:
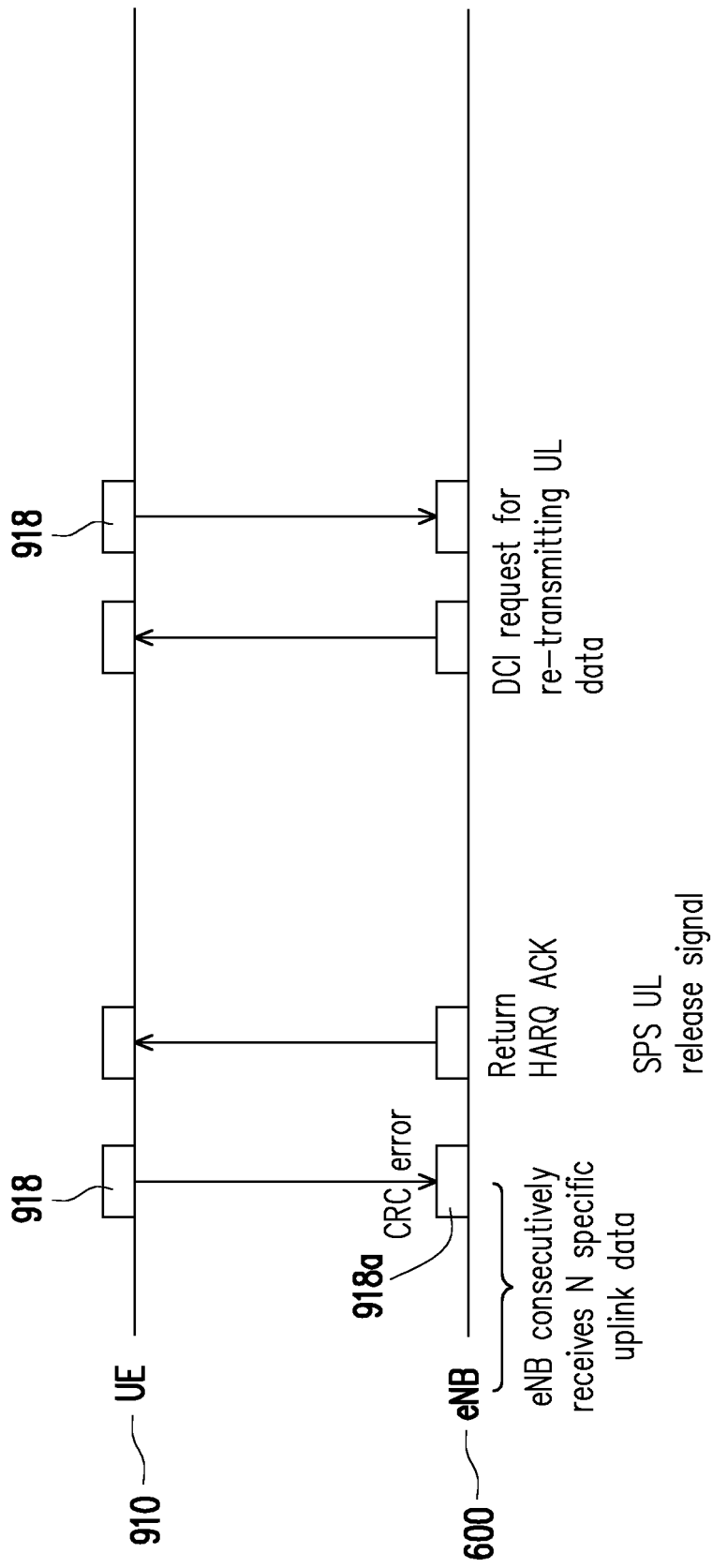
FIG. 9 is a schematic diagram illustrating a release SPS mechanism according to another embodiment of the disclosure.

With reference to FIG. 9, FIG. 9 is a schematic diagram illustrating a release SPS mechanism according to another embodiment of the disclosure, in which a horizontal axis represents time. In this embodiment, it is assumed that the predetermined number is 8 (i.e., N is 8), and pending data 918 is the 8$^{th}$ pending data being transmitted after 7 pending data (not illustrated) are consecutively transmitted by a UE 910. However, as shown by FIG. 9, the CRC error occurs when the eNB 600 is analyzing the pending data 918. That is to say, after successfully analyzing 7 pending data, the eNB 600 determines that 1 error data 918*a* occurs.

As described in the previous embodiment, before specifically knowing that the CRC error occurs, the L2 of the eNB 600 will first return the HARQ ACK signal to the UE. However, as already determined that the predetermined number of specific uplink data are consecutively received at the time (i.e., 7 pending data and 1 error data), the eNB 600 can perform the release SPS operation to cease receiving other uplink data corresponding to the UE 910 on the wireless resource assigned to the UE 910. In addition, the eNB 600 may also control the UE 910 through the SPS UL release signal to also perform the release SPS operation. In this embodiment, taking the LTE system as an example, the SPS UL release signal is a DCI (downlink control information) packet, but is not limited thereto. The SPS UL release signal is determined according to the instructions or packets for controlling the SPS in various communication systems.

That is to say, in response to consecutively receiving the predetermined number of specific uplink data as determined by the eNB 600, both the eNB 600 and the UE 910 can perform the release SPS operation. In this way, various mentioned situations where the wireless resource is wasted in the previous embodiments can be avoided so the overall system performance can be improved.

Next, after the L2 of the eNB 600 finds that the CRC error occurs, the eNB 600 can request the UE 910 to re-transmit the pending data 918 through the DCI request again, so as to complete the transmission with the UE 910.

In summary, the base station and the resource allocation method based on SPS thereof proposed by the disclosure can allow the base station to correspondingly release the wireless resource assigned to the UE after consecutively receiving the predetermined number of specific uplink data (which are consist of the pending data and at least one error data). As a result, unnecessary waste of the wireless resources due to the CRC error may be avoided and the communication efficiency may also be improved. In addition, for the base station belonging to the C-RAN, the method of the disclosure may also be used to avoid unnecessary waste of the wireless resources due to the CRC error and improve the communication efficiency.

It will be apparent to those skilled in the art that various modifications and variations can be made to the disclosed embodiments. It is intended that the specification and examples be considered as exemplary only, with a true scope of the disclosure being indicated by the following claims and their equivalents

The invention claimed is:

1. A resource allocation method based on semi-persistent scheduling (SPS), adapted for a base station, and comprising:

periodically receiving, by the base station, a plurality of uplink (UL) data corresponding to a user equipment on a wireless resource assigned to the user equipment;

in response to consecutively receiving, by the base station, a predetermined number of specific uplink data from the user equipment, performing, by the base station, a release SPS operation to cease receiving other uplink data corresponding to the user equipment on the wireless resource, wherein the specific uplink data consist of at least one pending data and at least one error data, wherein the method further comprises:

initializing a count value to 0;

in response to receiving first uplink data from the user equipment, determining whether the first uplink data belongs to one of the at least one pending data and the at least one error data;
in response to determining that the first uplink data belongs to one of the at least one pending data and the at least one error data, incrementing the count value;
in response to determining that the first uplink data does not belong to one of the at least one pending data and the at least one error data, resetting the count value to 0;
in response to determining that the count value reaching the predetermined number, determining that the predetermined number of specific uplink data from the user equipment have been consecutively received by the base station.

2. The method according to claim 1, wherein each of the error data is cyclic redundancy check error data.

3. The method according to claim 1, wherein each of the pending data includes a header and no payload.

4. The method according to claim 1, wherein in response to the count value being equal to the predetermined number, determining that the predetermined number of specific uplink data are consecutively received from the user equipment.

5. The method according to claim 1, further comprising:
controlling the user equipment to perform the release SPS operation, so as to control the user equipment to cease transmitting the other uplink data on the wireless resource.

6. The method according to claim 1, further comprising:
arranging the wireless resource for the user equipment based on an SPS mechanism.

7. The method according to claim 6, wherein before the step of arranging the wireless resource for the UE based on the SPS mechanism, the method further comprises:
transmitting an SPS UL activation signal to the user equipment, so as to activate the SPS mechanism between the base station and the user equipment.

8. The method according to claim 7, wherein after the step of performing the release SPS operation, the method further comprises:
re-transmitting the SPS UL activation signal to the user equipment, so as to re-activate the SPS mechanism between the base station and the user equipment.

9. The method according to claim 7, wherein the base station belongs to a centralized radio access network.

10. A base station, comprising:
a storage circuit, storing a plurality of modules;
a transceiver; and
a processor, coupled to the transceiver and the storage circuit, and accessing the modules to perform steps of:
controlling the transceiver to periodically receive a plurality of uplink (UL) data corresponding to a user equipment on a wireless resource assigned to the user equipment;
in response to consecutively receiving a predetermined number of specific uplink data from the user equipment, performing a release semi-persistent scheduling (SPS) operation to cease receiving other uplink data corresponding to the user equipment on the wireless resource, wherein the specific uplink data consist of at least one pending data and at least one error data, wherein the processor further performs:
initializing a count value to 0;
in response to receiving first uplink data from the user equipment, determining whether the first uplink data belongs to one of the at least one pending data and the at least one error data;
in response to determining that the first uplink data belongs to one of the at least one pending data and the at least one error data, incrementing the count value;
in response to determining that the first uplink data does not belong to one of the at least one pending data and the at least one error data, resetting the count value to 0;
in response to determining that the count value reaching the predetermined number, determining that the predetermined number of specific uplink data from the user equipment have been consecutively received by the base station.

11. The base station according to claim 10, wherein each of the error data is cyclic redundancy check error data.

12. The base station according to claim 10, wherein each of the pending data includes a header and no payload.

13. The base station according to claim 10, wherein in response to the count value being equal to the predetermined number, the processor is further configured for determining that the predetermined number of specific uplink data are consecutively received from the user equipment.

14. The base station according to claim 10, wherein the processor is further configured for:
controlling the user equipment to perform the release SPS operation, so as to control the user equipment to cease transmitting the other uplink data on the wireless resource.

15. The base station according to claim 10, wherein the processor is further configured for:
arranging the wireless resource for the user equipment based on an SPS mechanism.

16. The base station according to claim 15, wherein the processor is further configured for:
controlling the transceiver to transmit an SPS UL activation signal to the user equipment, so as to activate the SPS mechanism between the base station and the user equipment.

17. The base station according to claim 16, wherein the processor is further configured for:
controlling the transceiver to re-transmit the SPS UL activation signal to the user equipment, so as to re-activate the SPS mechanism between the base station and the user equipment.

18. The base station according to claim 16, wherein the base station belongs to a centralized radio access network.

* * * * *